May 3, 1938.                C. W. SINCLAIR                2,115,980
                              BRAKE DRUM
                         Filed July 27, 1931            3 Sheets-Sheet 1

INVENTOR
Charles W. Sinclair
BY
Whittemore Hulbert Whittemore Belknap
ATTORNEYS

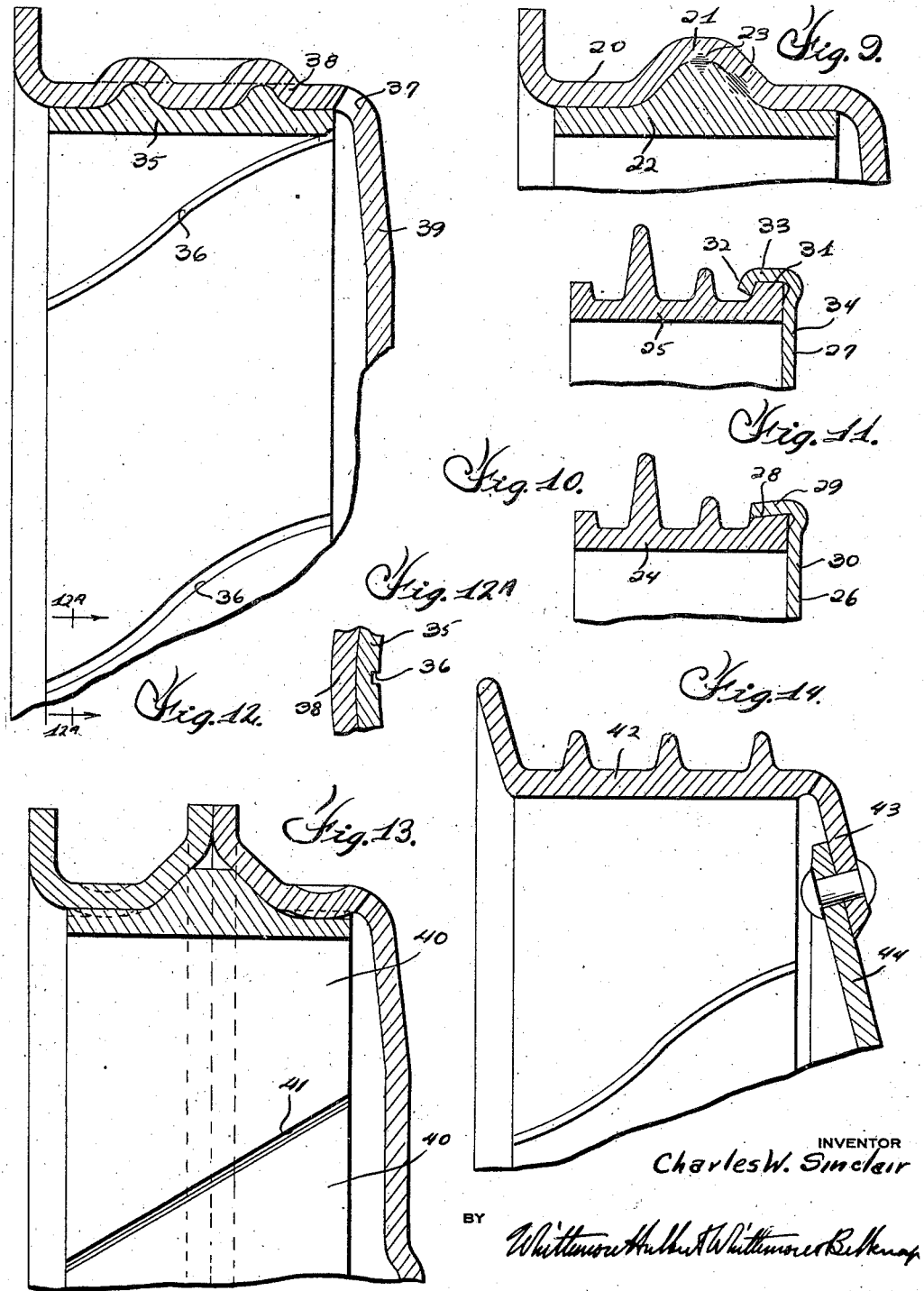

Patented May 3, 1938

2,115,980

UNITED STATES PATENT OFFICE 2,115,980

BRAKE DRUM

Charles W. Sinclair, Detroit, Mich., assignor, by mesne assignments, to The Kelsey-Hayes Wheel Company, Detroit, Mich., a corporation of Delaware Application July 27, 1931, Serial No. 553,452

11 Claims. (Cl. 188—218)

The invention relates to brake drums and has for one of its objects to so construct a brake drum that it and more particularly its brake engaging member has increased length of life in service. Other objects are to provide an improved construction of composite brake drum having an annular flange provided with a hollow reinforcing rib and a lining within the flange and provided with a rib engaging the reinforcing rib and a continuous inner brake engaging surface extending across and on opposite sides of the reinforcing rib; to provide a composite brake drum having an annular flange and a cast lining provided with means extending through the flange for anchoring the lining to the flange; to provide a brake drum having a centrifugally cast brake engaging member; and to provide a brake drum having a brake engaging member provided with means for collecting loose material, such as dirt, and preferably conducting the same away from the brake engaging member. A further object is to provide an improved method of making a composite brake drum.

These and other objects of the invention will become apparent from the following description, taken in connection with the accompanying drawings, in which Figure 1 is an axial section through a portion of a brake drum showing an embodiment of my invention;

Figures 7, 8, 9, 10, 11, 12, 13, 14, 15, 16, 17 and 18 are axial sections illustrating different embodiments of my invention;

Figure 19:
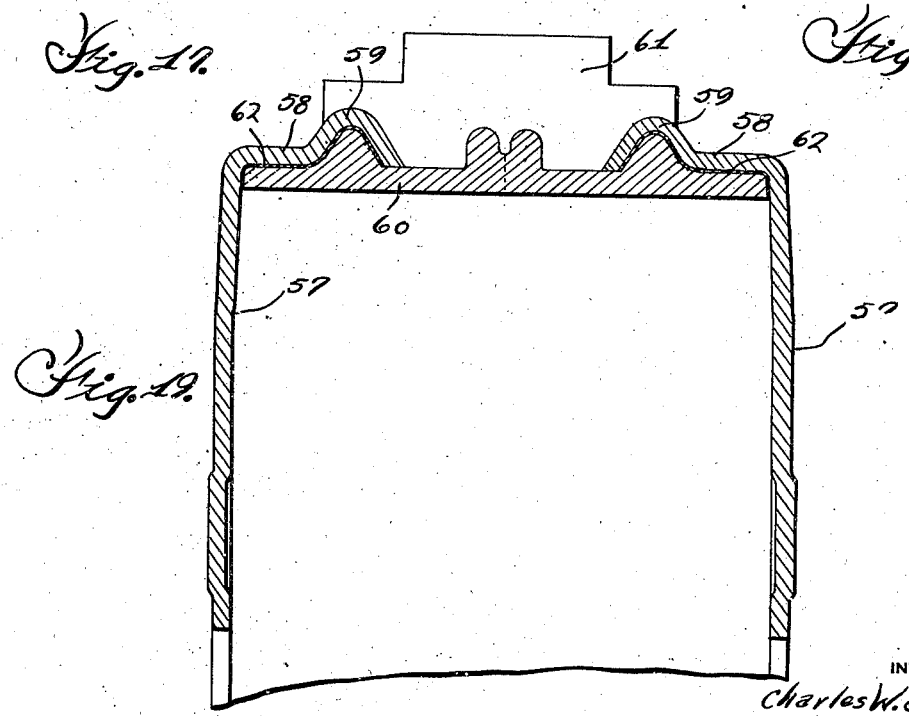

Figure 12ᵃ is a cross section on the line 12ᵃ—12ᵃ of Figure 12;

Figure 19 is an axial sectional view illustrating a method embodying my invention of making a composite brake drum.

Figure 1:
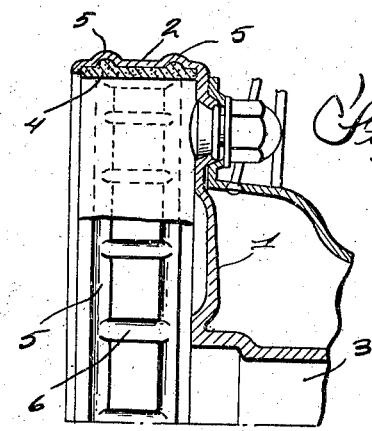
Figure 2:
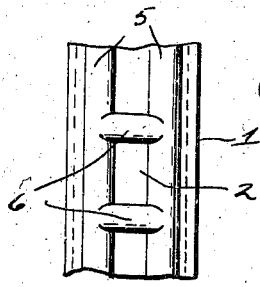
Figure 2 is an elevation of a portion of Figure 1.

As illustrated in Figures 1 and 2, the body of the composite brake drum is a stamping and comprises the sheet metal web 1 and the sheet metal annular flange 2 at the periphery of and integral with the web. This body is suitably positioned upon and secured to the inner hub 3. In order to enhance the wearing qualities and otherwise improve the efficiency of the brake drum, I have provided the brake engaging member 4 in the nature of an annular lining, which is formed of a different metal, such as cast iron or an alloy thereof, from the metal of the annular flange, which latter is steel or an alloy thereof. This lining is preferably centrifugally cast upon the inner surface of the annular flange and its inner surface is machined to remove the coarser grained inside surface structure and any impurities, if present, and to present an inner brake engaging surface of high wear resisting qualities. In the event that the annular flange is relatively thin, the heat in the lining while being centrifugally cast raises the temperature in the annular flange sufficiently to secure fusing and consequent molecular bond between the two. If the annular flange is relatively thick, it is preferably heated prior to the centrifugal casting operation and, as a result, molecular bond is also secured in this construction. Also, in the event that the lining is made of an alloy which does not readily fuse with the annular flange during the centrifugal casting operation, advantage is taken of the different coefficients of the annular flange and lining and the lining is fixedly secured to the annular flange because the latter has been expanded either by the heat of the lining during the casting or by heating before casting and then allowed to cool and shrink upon the lining. With this arrangement, the annular flange is under tension and the lining is under compression.

To anchor the lining to the annular flange, the latter is formed with the annular outwardly and circumferentially extending hollow ribs 5 spaced from each other and with the transversely or axially and outwardly extending hollow ribs 6, which merge into the ribs 5. Both the ribs 5 and 6 may be formed by either a rolling or a stamping operation and serve to reinforce the annular flange and they are filled by correspondingly outwardly extending ribs upon the lining. Since the outer surface of the lining, including its ribs, are molecularly bonded or fused to the inner surface of the annular flange, including its ribs, good heat conducting properties between the lining and annular flange are secured.

Figure 3:
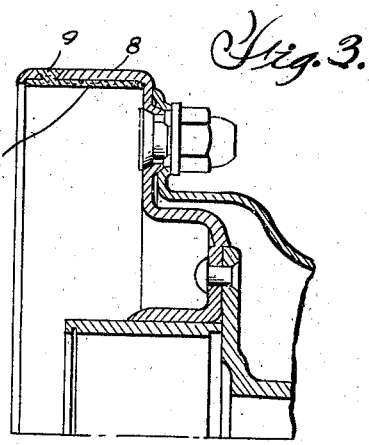
Figure 3 is a view similar to Figure 1 showing another embodiment of my invention.
Figure 4:
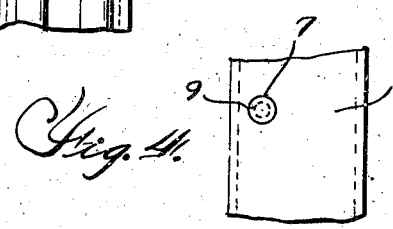
Figure 4 is an elevation of a portion of Figure 3.

As shown in Figures 3 and 4, the lining 7, which is also preferably centrifugally cast upon the inner surface of the sheet metal annular flange 8 is anchored to this flange by the undercut projections 9 integral with the main body of the lining and extending outwardly therefrom through the flange.

Figure 5:
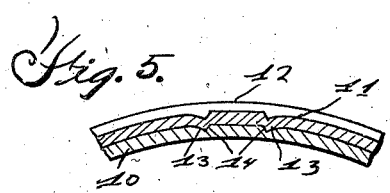
Figures 5 and 6 are detail sectional views showing another embodiment of my invention.
Figure 6:
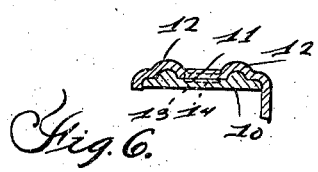

Figures 5 and 6 illustrate another method of anchoring the lining 10, which is preferably centrifugally cast upon the inner surface of the annular flange 11. In this construction the annular flange, which is also formed of sheet metal, is provided with the annular circumferentially and outwardly extending spaced hollow ribs 12 and the transverse or axial inwardly extending ribs 13 between the ribs 12 and providing the shoulders 14, both the ribs 12 and 13 including the shoulders 14 being firmly engaged by the lining and rigidly holding the lining from displacement relative to the annular flange.

Figure 7:
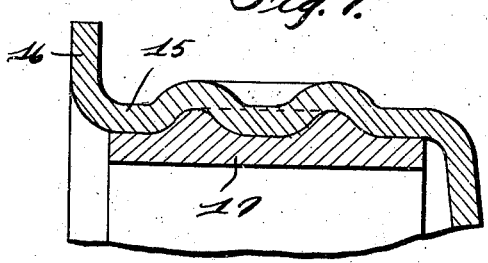

In the modification shown in Figure 7, the arrangement is very similar to that shown in Figures 1 and 2, with the exception that the sheet metal annular flange 15 of the brake drum body is provided with the outwardly extending reinforcing annular flange 16 at its free edge instead of an inwardly extending annular reinforcing flange. Also the lining 17 has its edges terminating short of those of the annular flange, this being accomplished as by securing removable segmental members to the brake drum body and closing the spaces inside and at the edges of the annular flange during the casting operation.

Figure 8:
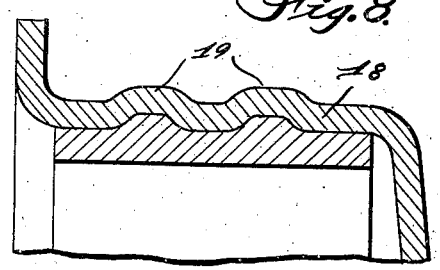

In the embodiment of my invention shown in Figure 8, the sheet metal annular flange 18 between its edges is formed with the annular outwardly and circumferentially extending hollow ribs 19 spaced from each other, the cross ribs being omitted.

As shown in Figure 9, the sheet metal annular flange 20 is formed intermediate its edges with the annular outwardly and circumferentially extending hollow reinforcing rib 21 of relatively great depth and, although the lining 22 is centrifugally cast in place, nevertheless, it is additionally fixedly secured upon the inner surface of the annular brake flange by burning in the hollow rib 21 at suitable points 23 by means of a welder.

As shown in Figures 10 and 11, the annular linings 24 and 25, respectively, are formed separately from the brake drum bodies 26 and 27, respectively. Both of these linings are preferably centrifugally cast with suitable apparatus and have their inner surfaces machined to provide good wear resisting properties. The lining 24, as shown in Figure 10, has an edge portion formed with the outwardly extending annular projection 28 having its outer surface tapered from the edge of the lining toward the middle. This tapered surface is engaged by the correspondingly tapered inner surface of the annular flange 29 of the brake drum body, which serves to hold the lining with an edge thereof against the web 30 of the brake drum body. The lining 25, shown in Figure 11, has an edge portion provided with the annular outwardly extending projection 31, the edge of which toward the median plane of the lining is engaged by the inturned portion 32 of the annular flange 33 of the sheet metal body, the inturned portion 32 holding an edge of the lining against the web 34 of the body.

The embodiment of my invention shown in Figure 12 is in general the same as that shown in Figure 7, with the added feature that the lining 35 is provided on its inner brake engaging surface with the grooves or recesses 36 for receiving loose material, such as dirt and the like. These grooves preferably extend diagonally from one edge of the lining to the other and are adapted to conduct the loose material away from the lining, so that it may pass out through the elongated openings or slots 37 formed in the brake drum body at the juncture between the sheet metal annular flange 38 and the sheet metal web 39.

Figure 13 shows a modification of that of Figure 12 in which the lining is formed of the arcuate sections 40 in end to end engagement with the adjacent ends provided on their inner surfaces with rabbets cooperating to form the grooves 41 for receiving dirt and taking the same away from the lining.

In the modification of my invention shown in Figure 14, the brake engaging member 42 is self-supporting and may be formed of mill section, hooped, welded and sized, or of a casting, and preferably a centrifugal casting. This brake engaging member 42 is provided with the inturned flange 43 by means of which the member is fixedly secured in predetermined relation to the web 44. In this construction the inner surface of the brake engaging member is provided with the grooves 45 similar to those shown in Figure 12 and adapted to receive and conduct loose material, the brake engaging member at the juncture between its flange 43 and its annular flange being preferably provided with elongated openings or slots for the exit of the loose material.

Figure 15:
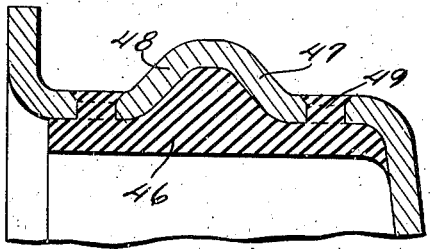

Figure 15 shows another embodiment of my invention in which the lining 46 is a rubber composition which is molded within the annular sheet metal flange 47 of the brake drum body and cured in place. The annular flange is preferably provided intermediate its edges with the annular circumferentially and outwardly extending reinforcing rib 48 which is filled by an outwardly extending rib upon the lining. The lining may be additionally secured to the annular flange by means of the integral outwardly extending projections 49 of the lining extending through the annular flange.

Figure 16:
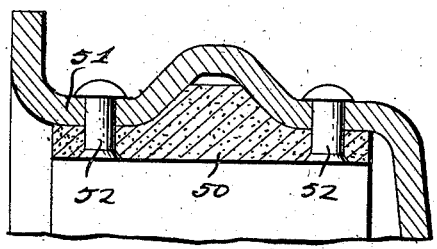

The embodiment of my invention shown in Figure 16 illustrates the lining 50 formed of usual or regular brake lining material which is secured to the sheet metal annular flange 51 of the brake drum body by means of the rivets 52.

Figure 17:
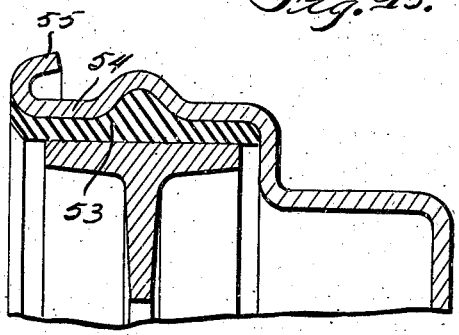

Figure 17 shows a modification of the composite brake drum illustrated in Figure 15, in which the rubber composition lining 53 extends to the free edge of the sheet metal annular flange 54 of the brake drum body and dependency is placed upon the fact that the lining is vulcanized to the annular flange for fixedly securing the two together. In this modification the annular flange at its free edge is provided with the return bent reinforcing flange 55.

Figure 18:
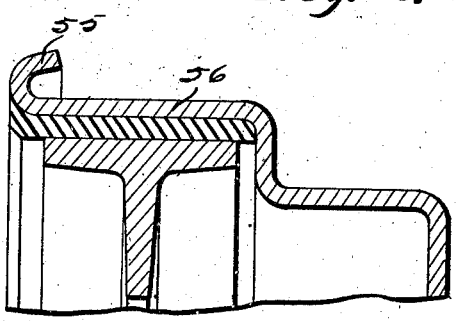

Figure 18 shows a construction differing from that of Figure 17 in that the sheet metal annular flange 56 is not provided with an annular outwardly and circumferentially extending hollow rib intermediate its edges.

Figure 19 shows another form of composite brake drum and also the method of making the same. The brake drum has the sheet metal body comprising the web 57 and the annular flange 58, which latter is provided at its free edge with the annular outwardly and circumferentially extending hollow reinforcing rib 59. The lining 60 is centrifugally cast upon the inner surface of the annular flange. To form such a composite brake drum I provide a pair of brake drum bodies and secure these bodies in axial alignment and in opposed relation with the annular flanges facing and spaced from each other. I fill the space between the free edges of the annular flanges by suitable means such as the segmental fixtures 61 and then rotate the bodies and fixtures as a unit and during the rotation centrifugally cast the lining upon the inner surfaces of the annular flanges and fixtures, the molten metal forming the lining being inserted through either or both of the central openings of the webs of the bodies. After the lining has cooled, the fixtures are removed and the cast metal is then severed midway between the free edges of the annular flanges forming a pair of composite brake drums. The inner surfaces of the linings of these brake drums may then be machined.

In order to secure a better molecular bond between the lining 60 and the annular flange 58, the inner surface of the latter, prior to the casting operation, is preferably lined or plated with a relatively thin coat of suitable material 62, which will more readily fuse, such as tin.

What I claim as my invention is:

1. A brake drum, comprising an annular flange having outwardly extending hollow reinforcing ribs extending circumferentially and axially of said flange and merging into each other and a lining within and engaging said flange, said lining having ribs extending within said first mentioned ribs.

2. A brake drum, comprising an annular flange having outwardly extending hollow reinforcing ribs extending circumferentially and axially of said flange and merging into each other and a centrifugally cast lining upon the inner surface of said flange.

3. A brake drum, comprising an annular flange having shoulders extending axially of said flange and inwardly toward the axis of said flange, and a cast lining upon the inner surface of said flange and engaging said shoulders.

4. A brake drum, comprising a sheet metal annular flange having ribs extending axially of and also inwardly toward the axis of said flange, and a centrifugally cast lining upon the inner surface of said flange and engaging said ribs.

5. A brake drum, comprising an annular flange having ribs extending axially of said flange, and a lining within said flange and having portions engaging said ribs.

6. A brake drum, comprising a revoluble body and a brake engaging member secured to said body and having a diagonally extending groove in its brake engaging surface for collecting loose material and conducting the same away.

7. A brake drum, comprising a body having a web and an annular flange, and a brake engaging lining within said flange and having a diagonally extending groove in its brake-engaging surface for collecting and conducting loose material, said body having an opening for the passage of the loose material.

8. A brake drum, comprising a revoluble body member and a brake engaging member secured to said body member and having a diagonally extending groove in its brake engaging surface for collecting and conducting loose material, one of the members having an opening for the passage of the loose material.

9. A brake drum, comprising an annular flange and a sectional liner within said flange and having the adjacent ends of the brake engaging surfaces of its sections forming grooves for collecting loose material.

10. A brake drum, comprising a revoluble brake engaging member formed with a substantially cylindrical brake engaging surface and provided with a groove in its surface inclined to and opening through an edge of said member.

11. A brake drum, comprising a revoluble member having a brake engaging surface and provided with a diagonally extending groove in its surface opening through an edge thereof for collecting loose material and conducting the same away from the surface.

CHARLES W. SINCLAIR.